Nov. 16, 1954           O. NÜBLING           2,694,288

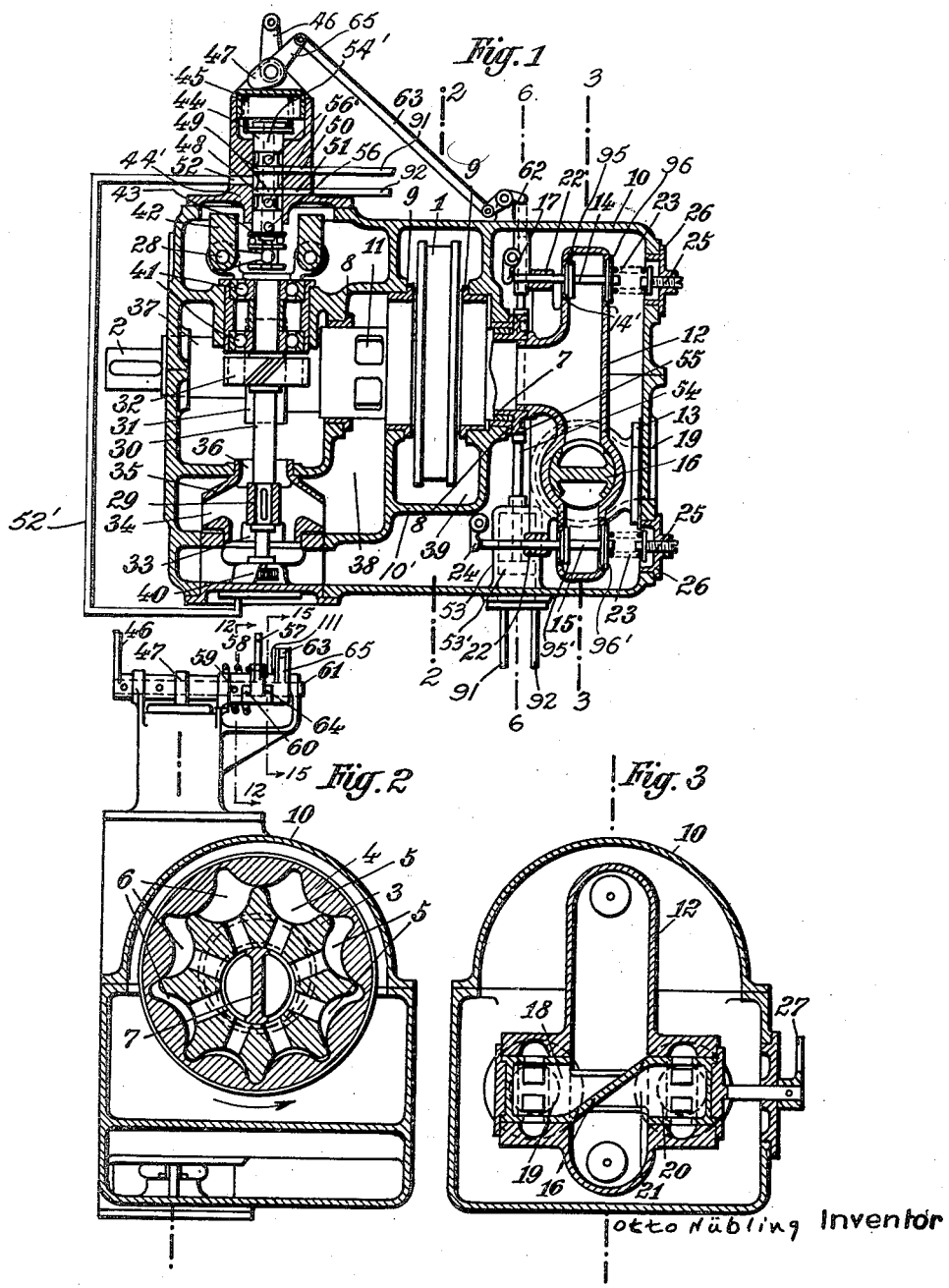

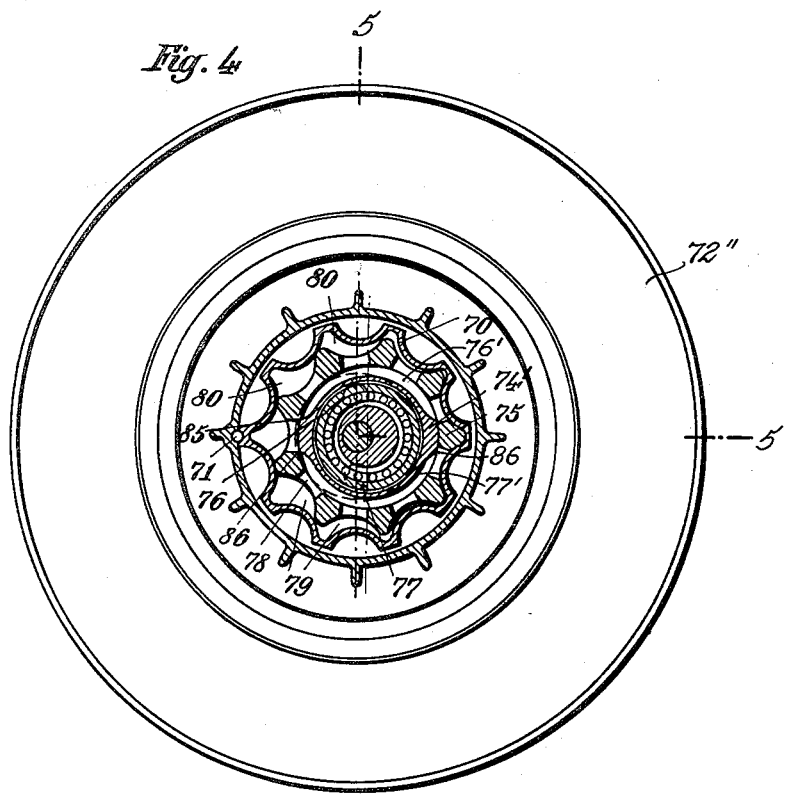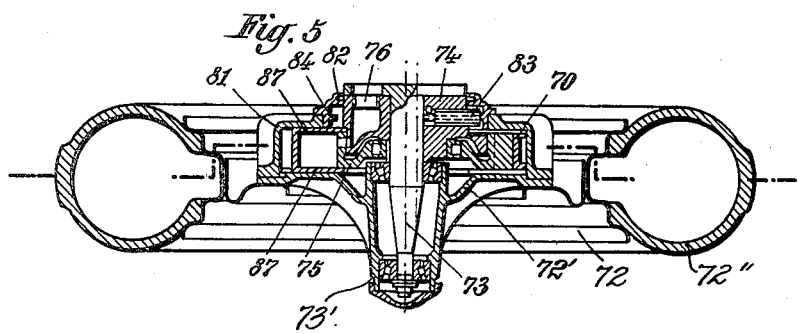

ROTARY PUMP AND MOTOR HYDRAULIC TRANSMISSION

Filed Dec. 8, 1950           5 Sheets-Sheet 3

INVENTOR.
OTTO NÜBLING
BY
Michael S. Struker
agt.

Nov. 16, 1954          O. NÜBLING          2,694,288
ROTARY PUMP AND MOTOR HYDRAULIC TRANSMISSION
Filed Dec. 8, 1950          5 Sheets-Sheet 4
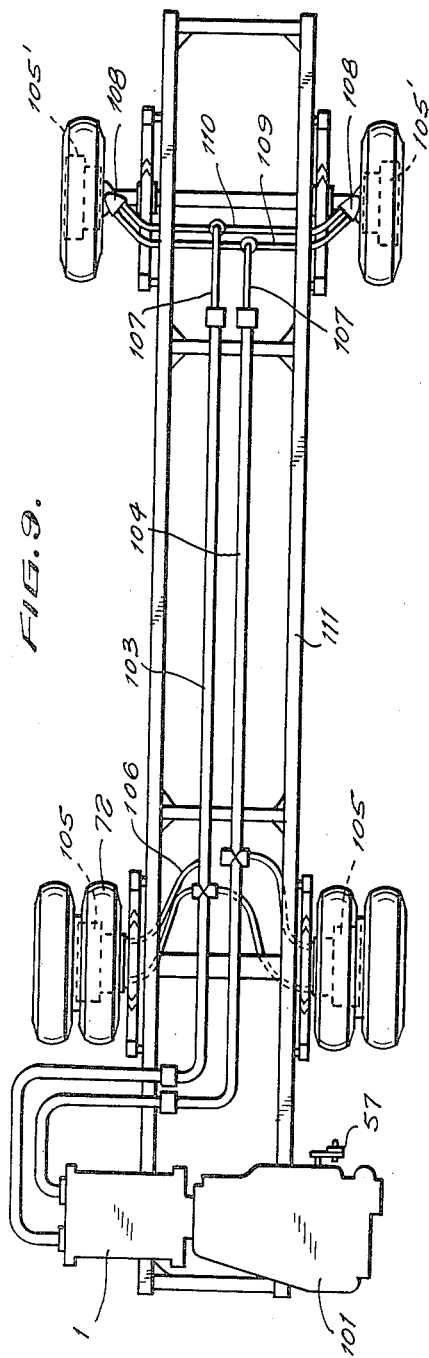
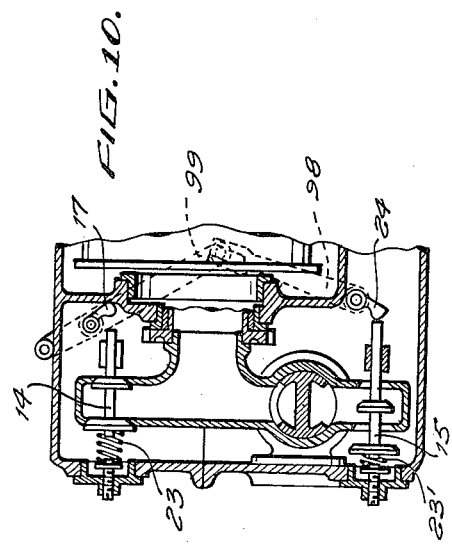
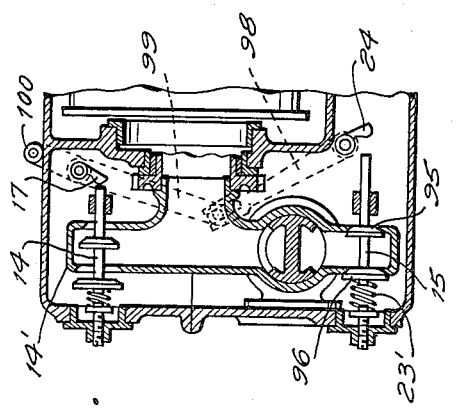
INVENTOR.
OTTO NÜBLING
BY
Michael S. Striker
agt.

Nov. 16, 1954  O. NÜBLING  2,694,288
ROTARY PUMP AND MOTOR HYDRAULIC TRANSMISSION
Filed Dec. 8, 1950  5 Sheets-Sheet 5

INVENTOR.
OTTO NÜBLING
BY
Michael S. Struker
agt.

United States Patent Office 2,694,288
Patented Nov. 16, 1954

2,694,288

ROTARY PUMP AND MOTOR HYDRAULIC TRANSMISSION

Otto Nübling, Berlin-Frohnau, Germany

Application December 8, 1950, Serial No. 199,745

10 Claims. (Cl. 60—19)

The present invention relates to a continually regulable hydraulic drive for a vehicle, and more particularly to an arrangement providing in the wheels of the vehicle hydraulic motors driven by a rotary pump rotated by a prime mover.

It is the object of the present invention to provide a hydraulic drive for a vehicle replacing the clutch, the transmission, the differential gear, and one of the brakes of a vehicle.

It is a further object of the present invention to provide a coupling arrangement for hydraulically coupling, and braking, respectively, the hydraulic motors driving the vehicle.

It is a still further object of the present invention to provide an automatic regulating arrangement for adjusting a control valve controlling the output of the pump.

It is a still further object of the present invention to provide operating means for adjusting the speed controlling means of the prime mover to the output of the pump.

It is still another object of the present invention to adust the speed control means of the prime mover when the control valve controlling the pump is near its end position corresponding to maximum output of the pump in order to prevent racing of the prime mover.

With these objects in view the present invention mainly consists in a rotary pump mounted in a housing and driven by a prime mover which may be a gasoline or diesel engine. A control valve is turnably mounted in the rotary pump and rotated by a servomotor so as to regulate the output of the rotary pump during rotation.

A pump means is connected by conduits to the servomotor, and a regulating valve is arranged in the conduits which controls the movement of the servomotor and thereby the adjustment of the control valve of the rotary pump.

The main shaft connecting the prime mover and the rotary pump is connected by a transmission to a further shaft on which a centrifugal means is mounted. The regulating valve is urged by the centrifugal means to move in one direction, while urged by a spring in an opposite direction. In a position of equilibrium the servomotor is cut off from the oil supply by the regulating valve and the control valve does not move. When the speed of the main shaft changes, the centrifugal means exert a force on the regulating valve which is greater or smaller than the force of the spring whereby the servomotor is actuated to move the control valve to a position which changes the output of the pump and thereby the speed of the main shaft until the regulating valve is again in a balanced position and the control valve stops.

The speed at which this takes place may be manually adjusted by changing the spring tension. The speed control means of the prime mover, such as a carburetor or an injection pump, may be simultaneously automatically adjusted.

In order to prevent racing of the prime mover when the control valve adjusts the pump to maximal output while the resistance offered by the hydraulic motor is small, a lever system is provided between the servomotor and the speed of the control means of the prime mover by which the speed of the prime mover is reduced shortly before the control valve reaches its end position corresponding to maximal output of the pump. The pump and the hydraulic motors are preferably gear type hydraulic apparatuses and are not an object of the present invention. The control valve adjusting the output of the pump extends axially through the pump and is formed with supply and discharge conduits so that the operating fluid is supplied in axial direction to the suction side of the pump from the interior of the pump housing and discharged from the other side of the pump. The operating fluid discharged from the pump enters a sealed casing which is mounted in the pump housing and divided by a reversing valve into two chambers. A spring-loaded valve is provided in each of these chambers permitting in open position the fluid supplied by the pump to return to the pump housing. Conduits connect the casing with the hydraulic motor and when one of the valves is closed and the other valve opened, the fluid circulates through the hydraulic motor and returns through the casing into the pump housing. Closing of the other valve causes braking of the hydraulic motor.

Preferably motion-transmitting means connect the valves in the casing so that the coupling valve and the braking valve are simultaneously operated in opposite directions. In intermediate position, however, both valves are open and permit idling of the pump and of the hydraulic motor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a longitudinal cross-section through a pump housing illustrating the regulating means and coupling means for the pump and the hydraulic motor;

Fig. 2 is a cross-section on line 2—2 in Fig. 1;

Fig. 3 is a cross-section on line 3—3 in Fig. 1;

Fig. 4 is a sectional view through a wheel provided with a hydraulic motor;

Fig. 5 is a sectional view on line 5—5 in Fig. 4;

Fig. 9 is a schematic plan view illustrating the arrangement of the prime mover, the pump and the hydraulic motor on a vehicle;

Figs. 10 and 11 are sectional views on line 11—11 in Fig. 6 of a detail of Fig. 1 showing two positions of the coupling arrangement.

Figure 8:
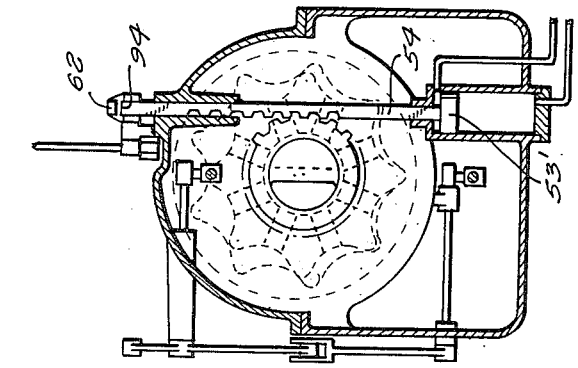
Figs. 6, 7 and 8 are cross-sectional views on line 6—6 in Fig. 1 showing the control valve in different positions.

Referring now to the drawings and more particularly to Fig. 9, 111 indicates the chassis of a vehicle, 101 indicates a prime mover, such as a gasoline or diesel oil engine, 1 indicates a pump which is driven by engine 101, and connected by pipes 103 and 104 to hoses 106 to motors 105 which are built into the wheels. The main lines 103 and 104 are connected by hoses 107 to pipes 109 and 110 which are connected by turntable connections to the inlets and outlets of the motors 105' in the front wheels in order to permit turning of the front wheels and steering of the car. When the engine 101 is operated, the pump 1 discharges oil through pipe 103 to the motors 105 and 105' for driving the same, while the oil returns from the motors 105 to the pump 1 through the pipe 104.

The construction of the pump 1 and of the control arrangement for the hydraulic drive can be best seen from Figs. 1, 2 and 3. The drive shaft 2 is driven by the engine 101, shown in Fig. 9, and rotates the gear-type pump 1. Pump 1 comprises an outer rotary member 4 provided with internal teeth, an inner rotary member 3 provided with outer teeth meshing with the internal teeth of member 4, and having one tooth less than the rotary member 4. The outer member 4 is eccentrically mounted with respect to the inner member 3 so that during rotation in the direction of the arrow in Fig. 2 the volume of the spaces 5 increases and the volume of the spaces 6 decreases. Oil supplied through one side of the control valve 7 is sucked into the spaces 5, pressed out of the spaces 6 and discharged through the other side of the control valve 7. The construction of the pump and control valve, however, is not an object of the present invention, but it will be understood that the operating oil is supplied to and discharged from the pump in an axial direction, the discharge end of the valve 7 being indicated in Fig. 1 with reference numeral 7, while the operating oil is sucked into the pump 1 through openings 11.

The pump 1 is mounted in a housing 10 and discharges the operating oil into a sealed inner casing 12 which is supported by a flange 13 on the housing 10. The housing 10 is subdivided by several supporting walls 10' defining a space 39 around the pump 1, a space 38 from which the oil is sucked into the pump, and a space 37 connected to the outside for ventilation.

On the inner casing 12, Figs. 1 and 3, a reversing valve 15 is mounted turnably by lever 27, which is operated by the driver of the vehicle. Oil discharged through control valve 7 passes through the inner casing 12 into the space 18 in the reversing valve 16, and out of the outlet 19 into the pipe 103 to the motors 105. When the reversing valve is turned by means of lever 27, the oil passes through the space 21 and opening 20 to the motors 105 so that the same are driven in reversed direction. During forward operation of the car, however, the opening 20 is an inlet through which the oil returns into the lower portion of the inner casing 12 after having passed through the motors 105.

In the inner casing 12 two valve means 14 and 15 are provided. When valve means 15 is opened the oil returned by the motors 105 enters the housing 10 and collects at the bottom of the housing. If, however, the valve 15 is closed, oil cannot be discharged from the motors 105 and the motors 105 are braked. Valve means 15 will, therefore, be referred to hereafter as brake valve means.

If the upper valve 14 is in open position, oil discharged by pump 1 through control valve 7 into the casing 12 can return into the housing 10. As soon as valve 14 is closed, the oil passes through the outlet 19, and the pump 1 is coupled to the motors 105. Therefore, valve means 14 will be referred hereafter as by-pass valve means.

The by-pass valve means 14 and the brake valve means 15 are each provided with two valve heads so that the pressure in the casing 12 acts in opposite directions on valve means 14 and 15. Since the valve heads 96 and 96', respectively, are slightly larger than the valve heads 95 and 95', respectively, the pressure in the inner casing 12 tends to open the valve means 14 and 15. Springs 23, 23' are provided for closing the by-pass valve means and the brake valve means and may be adjusted by screws 25. It will be understood that springs 23 have to overcome only the pressure difference between the pressures on the valve heads 96 and 95.

The by-pass valve means 14 and the brake valve means 15 are operated by levers 17 and 24, respectively, acting on valve stems slidably mounted in supporting bearings 22. The levers 17 and 24 are manually operated by a pair of levers 98 and 99 through shafts 97 as clearly shown in Figs. 6, 7, 8, 10 and 11.

In an intermediate position the coupling valve means and the brake valve means are almost closed. When the lever 100 is operated by the driver of the car in one direction the lever 17 releases the by-pass valve means 14 which is closed by spring 23. Simultaneously the brake valve means 15 is opened by levers 98 and 24 (Fig. 10). In this position of the valve means 14 and 15 the motors 105 are coupled to the pump 1 and the car may be operated. When the lever 100 is shifted in the opposite direction the coupling valve means 14 is opened and the brake valve means 15 is closed (Fig. 11). In this position the oil discharged by pump 1 flows through valve means 14 back into the housing 10 while the oil discharged by the motors 105 cannot flow back into the housing 10, whereby the motors 105 and the car is braked. The spring 23 of the brake valve means 15 counteracts the brake pressure. If such pressure is too high, the brake valve means 15 act as a safety valve, and the oil pressure in the lower portion of the inner casing 12 opens the brake valve means 15 against the action of the spring 23, the valve head 96' being larger than the valve head 95', so that the oil discharged by motors 105 can return to the housing 10.

The above-described construction has the particular advantage that only a small casing has to be sealed against high pressure. The connecting points 19, 20 for the outlet and inlet pipes are easily accessible on the face of the housing 10 and may be arranged at a slightly higher level than the motors 105 driving the wheels. When oil is filled into the housing 10, the pipes 103 must also be filled and contain a large part of the oil supply. In the arrangement according to the present invention air can escape from the motors 105 and the connecting pipes 103 and 104 through the coupling valve means when the same is opened.

The above-described arrangement replaces the clutch, the reverse gear, and one brake of a conventional vehicle.

Referring now again to Fig. 1, a shaft 30 is mounted in the housing 10 extending normal to the main shaft 2 and driven from the same by means of helical gears 31 and 32. Since the main shaft 2 is generally coupled directly to the flywheel of the driving engine 101, the arrangement of the helical gears 31 and 32 close to the coupling point is very advantageous since torque oscillations of the shaft 30 are prevented.

A centrifugal pump 29 is mounted on the shaft 30 and supplies oil from the lower portion of the housing 10 to the chamber 38 from which the oil is sucked into the pump 1 through the openings 11. The rotary member 34 of the centrifugal pump 29 has downwardly inclined discharge outlets 34 and an axial opening 36. Consequently oil foam, which has a lower specific gravity than clear oil, passes through the axial opening 36 while oil which is free of foam is thrown into space 38 and supplied to the pump 1. The space 37 is connected to the outside so that the air contained in the oil foam may escape.

On the upper end of shaft 30 a centrifugal governor 28 is mounted rotatably on ball bearings 41. The movable centrifugal means 42 act on the lower end of a regulating slide valve 44' which is mounted on top of the housing 10. A spring 45 urges the regulating slide 44 downwardly. The tension of spring 45 is adjusted by cam 47 which is turned when the lever 46 is manually operated by the driver of the car (Fig. 2). Consequently the position of the regulating slide 44 which is upwardly urged by centrifugal means 42, and downwardly urged by the spring 45, depends on the manual adjustment of spring 45 by means of lever 46 and cam 47. In the position of equilibrium the manually variable spring pressure is compensated by the upward pressure of the centrifugal means 42 rotating at the desired speed. When the pump 1 rotates too fast or too slow, the slide 44 is displaced and effects regulation of the pump speed by means which will be explained hereinafter. Automatically operating regulating means are provided for keeping constant the rotary speed of pump 1 after such speed has been determined by manual adjustment of spring 45.

The control valve 7 in the pump 1 is mounted turnably between two positions which are substantially normal to each other. In the position shown in Figs. 2 and 8 all spaces 5 and 6 operate, and the output of the pump is a maximum. In the position shown in Fig. 6, however, the control valve 7 establishes a short circuit between discharge spaces 6 and suction spaces 5 so that oil circulates through the short-circuited spaces within the pump and the amount of oil discharged from and sucked into pump 1 is reduced to a minimum. In the intermediate positions of the control valve 7, only some of the spaces 5 and 6 are connected and the output of the pump is reduced compared with the output in the position of the control valve 7 shown in Figs. 2 and 8, but greater than in the position shown in Fig. 6.

Figure 7:
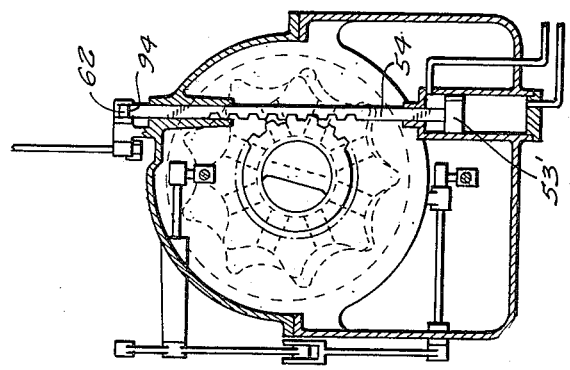
Figure 6:
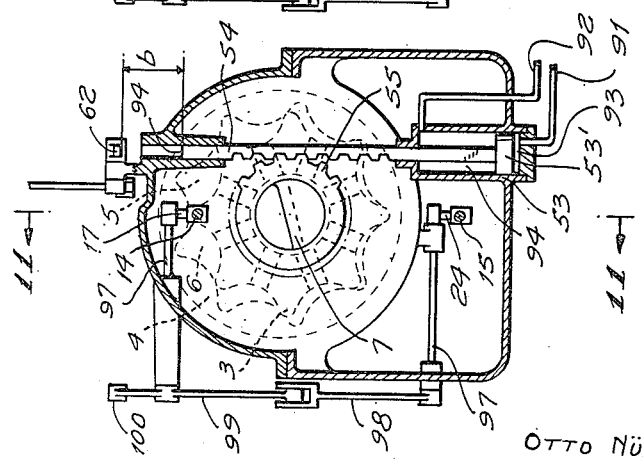

In order to regulate the output and speed of rotation of pump 1 the following regulating arrangement is provided. On the control valve 7 a gear 55 is fixedly mounted meshing with a rack rod 54, as shown in Figs. 6 to 8. The rack rod 54 is actuated by piston 53' of a servomotor 53. The spaces 94, 93 above and below the piston 53' are connected by conduits 91 and 92 to the regulating slide valve 44' and communicate with the passages 50 and 51. When the rotary speed of main shaft 2 and of shaft 30 increases due to road conditions, the centrifugal governor 42 urges regulating slide 44 upwardly so that slide portions 49 open the conduits 50 and 51. A gear pump 40 mounted on the lower end of shaft 30 is connected through a conduit 52' to the passage 52, and as soon as the passage 51 is open, oil is pressed through passages 52, 51 and conduit 91 into the space 93, below the servopiston 53' so that servopiston 53' moves upwardly and the rack rod 54 engaging gear 55 turns the control valve 7 counterclockwise towards the position shown in Fig. 7. Since this position of the control valve 7 corresponds to an increased output and reduced rotary speed of the pump 1, the higher speed which caused actuation of the regulating slide 44′ by means of centrifugal governor 42 is reduced.

If, however, the rotary speed of pump 1 drops, the centrifugal governor 28, 42 permits downward movement of the regulating slide 44 due to the action of spring 45, the passages 52 and 51 are connected, and oil is pressed through conduit 92 into the upper space 94 of the servomotor 93 and the piston 53′ is moved downwardly, turning the control valve 7 clockwise toward the minimum output position shown in Fig. 6 whereby the output of the pump 1 is reduced.

The regulating slide 44 is provided with an axially extending bore 54′, and transversal ducts 56. When the regulating slide is in its upper position, the oil displaced from the space 94 in the servomotor flows through conduit 92, passage 51, transversal ducts 56 and bore 54′ into the housing 10. When the regulating slide 44 is in lowered position, the oil displaced from space 93 passes through conduit 91, passage 51, transversal ducts 56′, bore 44′ into the housing 10.

The operation of the device is as follows:

The driver adjusts by means of lever 46 and cam 47 the tension of spring 45 whereby the desired output of the pump 1 and the speed of the motors 105 is determined. In the event that the rotary speed of the motors drops due to a higher resistance encountered by the car on a hill, the regulating slide 44 is operated and the control valve 7 adjusted by means of servomotor 53. As soon as a desired rotary speed is obtained again, the centrifugal governor actuates the regulating slide to close the passages 51 and 50 so that the servomotor stops and the control valve 7 remains in its adjusted position.

The gear type pump which is used in the described arrangement has its maximum output in the position of the control valve shown in Fig. 8. In this position the volume of the discharged oil is greatest and the pressure smallest, which may cause racing of the gasoline or diesel engine 101 which drives pump 1. In order to overcome this undesirable effect an adjustment arrangement for the carburetor or injection pump of the prime mover is provided.

Referring again to Fig. 2, a lever 57 which is operatively connected to the carburetor or injector pump, respectively, of the prime mover, is coupled to the lever 46 by means of the bushing 59 and claw 60, a coil spring 58 urging lever 57 and bushing 59 against claw 60. The bushing 59 is bored to receive a shaft 61 so that the lever 57 participates in the displacement due to the action of spring 58. A connecting rod 63 is pivotally connected to one end of a two-armed lever 62 which is pivotally mounted on the housing 10. The other end of the lever 62 is arranged above the actuating rack rod 54. As can be best seen from Figs. 6 to 8, the rack rod 54 engages the lever 62 shortly before the control valve 7 reaches its vertical position corresponding to maximal output. In this position, which is illustrated in Fig. 7, the output of the pump has almost reached a maximum and the change of the output of the pump between the positions of the control valve 7 in Figs. 7 and 8 is insignificant.

When the lever 62 is turned, the connecting rod 63 turns (through lever 65, bearing segments 111, and bearing segment 64) the lever 57 whereby the throttle of the engine is adjusted.

Referring now to Figs. 12–17, Fig. 12 shows the position of the elements when the spring 45 exerts minimum pressure which is attained by adjusting the lever 46 and thereby the cam 47. In this position the spring 58 presses the lever 57 and its bearing segment 60 into engagement with the bushing 59. When the lever 46 is operated to tension spring 45, spring 58 which is connected to the bushing 59 is tensioned since the bushing 59 is keyed to the shaft 61.

The tension of spring 58 is greater than the friction of the motion transmitting means connecting the lever 57 to the carburetor, or injection pump, respectively, of the prime mover and therefore lever 57 is turned by the spring 58, and the bushing 59 remains in engagement with bearing segment 60 due to the action of the spring tension.

Figure 12:
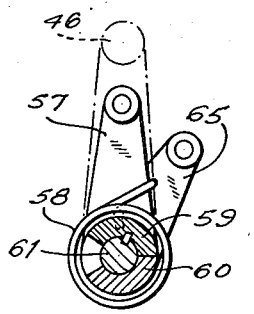
Figs. 12, 13, 14 are sectional views on line 12—12 in Fig. 2.
Figure 15:
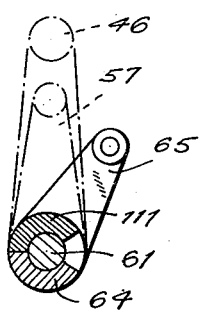
Figs. 15, 16, 17 are sectional views on line 15—15 in Fig. 2.
Figure 13:
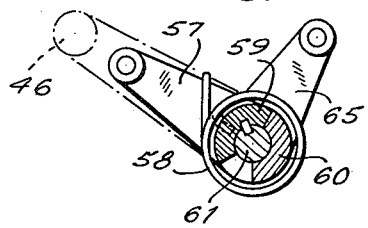
Figure 16:
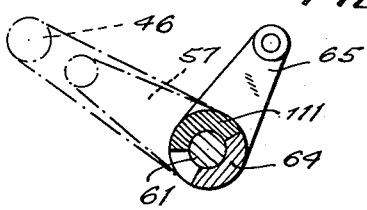

Fig. 15 corresponds to the position shown in Fig. 12, the spring 45 being adjusted to minimum tension, and shows the position of the bearing segment 111 which is a portion of the lever 65. When the lever 46 is turned to the position shown in Fig. 13 in which the spring 45 is more tensioned, bearing segment 64, which is a portion of the lever 57, can move without actuation of the lever 65 (see Fig. 16). At maximum rotary speed the rack bar 54 reaches its highest position and actuates the lever 65 to move into the position shown in Fig. 17. The bearing segment 111 turns the lever 57 through the bearing segment 64 so that the lever 57 effects adjustment of the fuel supply of the prime mover, reducing the same so that racing is prevented.

Figure 14:
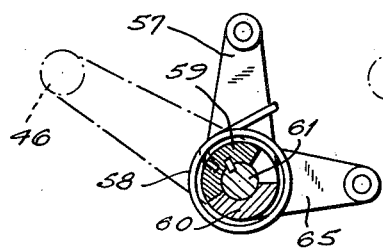
Figure 17:
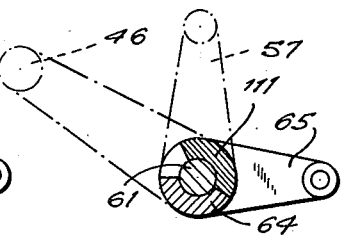

Since the lever 46 remains in its position, the spring 58 is tensioned by means of lever 65, as shown in Fig. 14. Such adjustment is automatic, since the operator cannot immediately operate the lever 46 in the event that the machine starts racing.

The volume of liquid supplied by the pump to the motors is automatically adjusted in accordance with the resistance encountered by the motors driving the wheels in order to keep the speed within predetermined limits. The regulating slide valve 44 has a predetermined regulating range corresponding to maximum and minimum rotary speeds of the pump and of the centrifugal governor 42. The distance through which the regulating slide 44 moves corresponds to such range, and this distance is covered by the regulating slide 44 regardless of the tension of the spring 44 and corresponds to the maximum and minimum rotary speeds of the pump which can be obtained at a given tension of the spring 45 which must be balanced by the centrifugal governor 42.

In the uppermost position of the regulating slide 44 the servomotor 53 adjusts the control valve 7 to the position shown in Fig. 8 in which the maximum liquid volume is discharged by the pump. In the lowermost position of the slide 44, the minimum liquid volume is discharged by the pump.

Tensioning of spring 45 increases the maximum and minimum speeds between which automatic regulation takes place.

Since the regulating slide 44 and the fuel supply means of the prime mover are operatively connected by members 47, 59 and 57, the output of the prime mover is adjusted together with the tension of the spring 45 in accordance with the average speed between the maximum and minimum rotary speeds obtained at such adjusted tension.

The centrifugal governor 42 operates the slide 44 against the action of spring 45 to actuate the servomotor so that the control valve 7 regulates the pump to discharge such liquid volume as is required by the motors for overcoming the resistance caused by road conditions. The rotary speed of the pump is between the maximum and minimum rotary speeds which constitute the range of the regulating slide 44 at any manually adjusted tension of the spring 45.

It is desirable to keep the range of automatic regulation low, which may be effected by constructive features obtaining low friction.

In order to apply more, or less, power, the operator operates the cam 47 whereby simultaneously the tension of the spring 44, and the fuel supply means of the prime mover are adjusted. Tensioning of the spring 45 effects increase of the rotary speed, which fluctuates within the regulated range, due to automatic operation of the regulating slide 44.

The servomotor adjusts the pump to discharge the liquid volume required by the motor for overcoming the road resistance at higher, or lower, rotary speeds. Not only the rotary speeds of the pump and of the motors are higher, when the tension of the spring 45 is increased, but also the prime mover will supply more power to the pump since its carburetor, or injection pump, respectively, are automatically adjusted by means of the lever 57 whenever the spring 45 is manually adjusted by the cam 47 to higher rotary speeds of the pump. The cam 47 is shaped in such manner that in each position of the cam the prime mover is adjusted to operate at highest efficiency. Consequently, the liquid discharge of the pump is not depending on the rotary speed of the prime mover, but is automatically adjusted to the road conditions, while simultaneously the prime mover is regulated to supply the required power.

It will be noted that the manual adjustment of lever 46 not only causes a predetermined tension of spring 45 but also a predetermined position of the throttle of the prime mover which is suitable for the output of the pump which is maintained by the regulating valve at the adjusted tension of the spring 45. During normal operation the pump is regulated only by the regulating valve 44' and by the servomotor 53 which adjusts the control valve 7. When, however, the control valve 7 approaches the extreme position shown in Fig. 8, a racing of the prime mover, the engine 101, is prevented by the automatic adjustment of the throttle by means of the lever system 62, 63.

The oil discharged from pump 1 passes through outlet 19 and connecting pipes 103 to the motors 105 and returns to the housing 10 through the pipe 104 and inlet 20.

Motors 105 are provided in the driven wheels of the vehicle at least in the two rear wheels. The construction of motors 105, and their arrangement in the wheel can be best seen from Figs. 4 and 5.

The hub 72' of the wheel 72 provided with a rubber tire 72" is rotatably mounted on the shaft 73 by means of a roller bearing 73'. The shaft 73 is fixedly secured to the car together with a supporting member 74 which has an eccentric cylindrical outer surface. The hydraulic motor 105 comprises again an inner annular rotary member 75 having outer teeth which is mounted on the supporting member 74 eccentrically to the outer rotary member 70 which is provided with inner teeth. On each side of the rotary members 17 and 75 a bronze disc 87 is arranged. The oil enters the hydraulic motor through inlet 77 and leaves it through outlets 77.

The oil flows through inlets 77 into a port 77' on supporting member 74 and from there through the slots 78 into the spaces 79 forcing spaces 79 to increase whereby the rotary members 70 and 75 and the wheel 72 are rotated clockwise in Fig. 4. After having passed through the maximum space 79 the oil enters the spaces 80, which are reducing in volume during rotation, and is discharged through slots 78 into the outlet port 76' of the member 74 and from there through the outlet 76. Inlet 77 is connected to pipe 103, and outlet 76 is connected to pipe 104 by hoses 106. The cylindrical faces 85, 86 of a wall portion 74' of the member 74 slidingly engage the inner cylindrical surface of the inner rotary member 75 and separate the ports 76' and 77' and thereby the supply side and the discharge side of the hydraulic motor.

Since the packing ring 82 cannot completely prevent leakage of oil from the oil motor, a small piston pump 83 is arranged in a cylindrical bore of the member 74 which extends vertically and is arranged below the shaft 73. A cam 84 secured to the casing 81, which is screwed to the hub 72, rotates with the wheel and actuates the piston 83 in the stationary member 74 to move upwardly against the action of a spring.

Oil which has leaked into the lowermost space in the wheel is sucked up by the pump and forced through return valves, not shown, into the outlet.

It will be understood that each of the elements described above, or two or more together, may also find a useful application in other types of hydraulic drives differing from the types described above.

While the invention has been illustrated and described as embodied in an automatic regulating arrangement for a hydraulic drive for a vehicle in which the driven motors are arranged in the wheels of the vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. An operating arrangement for hydraulic motors, comprising, in combination, a housing; a rotary pump mounted in said housing and driven by a prime mover; a control valve mounted in said rotary pump and controlling the output thereof, said control valve extending in axial direction through said pump and having an inlet on one side of said pump and an outlet on the other side of said pump through which an operating fluid is supplied and discharged, respectively; a casing mounted in said housing formed with three openings and through one opening communicating with said outlet of said rotary pump and communicating through the other openings with the supply and discharge side of a hydraulic motor; a reversing valve mounted in said casing and dividing the same into first and second chambers, the first of said chambers communicating with said rotary pump, each of said chambers communicating with one of said other openings in one position of said reversing valve and the other of said other openings in the other position of said reversing valve; reversing means operating said reversing valve and mounted on the outside of said housing; first spring-loaded valve means in said first chamber communicating in open position with the interior of said housing; second valve means in said second chamber communicating in open position with the interior of said housing; first and second actuating means opening said first and second valve means, respectively; motion-transmitting means operatively connecting said first and second actuating means for operation in opposite directions; a main shaft mounted in said housing and driving said rotary pump; a secondary shaft mounted in said housing extending normal to said main shaft; transmission means operatively connecting said main shaft and said secondary shaft for driving the latter; hydraulic servomotor means operating said control valve; auxiliary pump means mounted in said housing; conduit means connecting said auxiliary pump means with said hydraulic servomotor; a regulating valve mounted on said housing and arranged in said conduit means movably between a first position, a second position, and a third position, and in said first position causing said auxiliary pump means to move said hydraulic servomotor in one direction and to regulate the output of said rotary pump by said control valve, in said second position by-passing said auxiliary pump means and stopping said servomotor, and in said third position causing said auxiliary pump means to move said hydraulic servomotor in an opposite direction; spring means urging said regulating valve from said first position into said second and third positions; centrifugal means secured to one end of said secondary shaft and rotating with the same at a speed corresponding to the speed of said rotary pump, said centrifugal means engaging said regulating valve and during rotation urging the same against the action of said spring means from said third position thereof into said second and first positions; and movable operating means engaging said spring means and urging the same towards said regulating valve so as to gradually increase the pressure on the same.

2. An operating arrangement for hydraulic motors, comprising, in combination, a housing; a rotary pump mounted in said housing; a control valve mounted in said rotary pump and controlling the output thereof, said control valve extending in axial direction through said pump and having an inlet on one side of said pump and an outlet on the other side of said pump through which an operating fluid is supplied and discharged, respectively; a casing mounted in said housing formed with three openings and through one opening communicating with said outlet of said rotary pump and communicating through the other openings with the supply and discharge side of a hydraulic motor; a reversing valve mounted in said casing and dividing the same into first and second chambers, the first of said chambers communicating with said rotary pump, each of said chambers communicating with one of said other openings in one position of said reversing valve and the other of said other openings in the other position of said reversing valve; reversing means operating said reversing valve and mounted on the outside of said housing; first spring-loaded valve means in said first chamber communicating in open position with the interior of said housing; second valve means in said second chamber communicating in open position with the interior of said housing; first and second actuating means opening said first and second valve means, respectively; motion-transmitting means operatively connecting said first and second actuating means for operation in opposite directions; a main shaft mounted in said housing and driving said rotary pump; a secondary shaft mounted in said housing extending normal to said main shaft; transmission means operatively connecting said main shaft and said secondary shaft for driving the latter; hydraulic servomotor means operating said control valve; auxiliary pump means mounted in said housing; conduit means connecting said auxiliary pump means with said hydraulic servomotor; a regulating valve mounted on said housing and arranged in said conduit means movably between a first position, a second position, and a third position, and in said first position causing said auxiliary pump means to move said hydraulic servomotor in one direction and to regulate the output of said rotary pump by said control valve, in said second position by-passing said auxiliary pump means and stopping said servomotor, and in said third position causing said auxiliary pump means to move said hydraulic servomotor in an opposite direction; spring means urging said regulating valve from said first position into said second and third positions; centrifugal means secured to one end of said secondary shaft and rotating with the same at a speed corresponding to the speed of said rotary pump, said centrifugal means engaging said regulating valve and during rotation urging the same against the action of said spring means from said third position thereof into said second and first positions; movable operating means engaging said spring means and urging the same towards said regulating valve so as to gradually increase the pressure on the same; a prime mover operatively connected to said main shaft and driving said rotary pump; movable speed control means on said prime mover controlling the speed of the same; actuating means connecting said movable operating means with said speed control means and adjusting said speed control means in accordance with the position of said movable operating means so as to adjust the speed of said prime mover to the output of said rotary pump; a lever system connected at one end to said actuating means; and an actuating rod connected to said hydraulic servomotor and moved by the same, said actuating rod engaging the other end of said lever system when said servomotor has moved said control valve almost to the end position of said control valve corresponding to the maximum output of said rotary pump, said actuating rod moving said lever system and thereby said actuating means to adjust said speed control means of said prime mover independently of the adjustment thereof by said movable operating means.

3. In an operating arrangement for two coaxial wheels and a hydraulic motor mounted in each of said wheels and driving the same, in combination, a housing; a rotary pump mounted in said housing; a control valve mounted in said rotary pump and controlling the output thereof, said control valve extending in axial direction through said pump and having an inlet on one side of said pump and an outlet on the other side of said pump; a casing mounted in said housing formed with three openings and through one opening communicating with said outlet of said rotary pump and communicating through the other openings with the supply and discharge side of a hydraulic motor; a reversing valve mounted in said casing and dividing the same into first and second chambers, the first of said chambers communicating with said rotary pump, each of said chambers communicating with one of said other openings in one position of said reversing valve and the other of said other openings in the other position of said reversing valve; reversing means operating said reversing valve and mounted on the outside of said housing; first spring-loaded valve means in said first chamber communicating in open position with the interior of said housing; second valve means in said second chamber communicating in open position with the interior of said housing; first and second actuating means opening said first and second valve means, respectively; motion-transmitting means operatively connecting said first and second actuating means for operation in opposite directions; a main shaft mounted in said housing and driving said rotary pump; a secondary shaft mounted in said housing extending normal to said main shaft; transmission means operatively connecting said main shaft and said secondary shaft for driving the latter; hydraulic servomotor means operating said control valve; auxiliary pump means mounted in said housing; conduit means connecting said auxiliary pump means with said hydraulic servomotor; a regulating valve mounted on said housing and arranged in said conduit means movably between a first position, a second position, and a third position, and in said first position causing said auxiliary pump means to move said hydraulic servomotor in one direction and to regulate the output of said rotary pump by said control valve, in said second position by-passing said auxiliary pump means and stopping said servomotor, and in said third position causing said auxiliary pump means to move said hydraulic servomotor in an opposite direction; spring means urging said regulating valve from said first position into said second and third positions; centrifugal means secured to one end of said secondary shaft and rotating with the same at a speed corresponding to the speed of said rotary pump, said centrifugal means engaging said regulating valve and during rotation urging the same against the action of said spring means from said third position thereof into said second and first positions; movable operating means engaging said spring means and urging the same towards said regulating valve so as to gradually increase the pressure on the same; a prime mover operatively connected to said main shaft and driving said rotary pump; movable speed control means on said prime mover controlling the speed of the same; actuating means connecting said movable operating means with said speed control means and adjusting said speed control means in accordance with the position of said movable operating means so as to adjust the speed of said prime mover to the output of said rotary pump; a lever system connected at one end to said actuating means; and an actuating rod connected to said hydraulic servomotor and moved by the same, said actuating rod engaging the other end of said lever system when said servomotor has moved said control valve almost to the end position of said control valve corresponding to the maximum output of said rotary pump, said actuating rod moving said lever system and thereby said actuating means to adjust said speed control means of said prime mover independently of the adjustment thereof by said movable operating means.

4. In a hydraulic drive including a pump and at least one hydraulic motor, a coupling arrangement, comprising, in combination, a housing communicating with the suction side of the pump; a casing located in said housing and supported by the same, said casing being formed with two substantially parallel walls and formed with an outlet communicating with the supply side of the hydraulic motor and having an inlet communicating with the discharge side of the hydraulic motor; a reversing valve arranged in said casing and dividing the same into a first and second chamber, said reversing valve being mounted movably between two positions and in one position connecting said first chamber with said outlet in said casing and said second chamber with said inlet in said casing, and in the other position thereof connecting said first chamber with said inlet and said second chamber with said outlet; reversing means operating said reversing valve and moving the same between said two positions thereof; conduit means connecting said first chamber with the discharge side of said pump; first valve means mounted on said casing and in open position connecting said first chamber with the interior of said housing; second valve means mounted on said casing and in open position connecting said second chamber with the interior of said housing, each of said first and second valve means including two circular valve seats, one in each of said parallel walls, a larger valve head seated on the outside and a smaller valve head seated on the inside of said casing on said valve seats, and a valve stem connecting said valve heads, the pressure in said casing causing a higher pressure on said larger valve heads which tends to open said first and second valve means; spring means abutting against said housing and engaging the respective larger valve head of said first and second valve means and urging the same into closed position; first and second actuating means engaging said first and second valve means, respectively, and opening the same against the action of said spring means, opening of said second valve means permitting circulation of a fluid discharged through said pump through said first chamber, through the hydraulic motor, through said second chamber into the interior of said housing, and therefrom back to the pump, while opening of said first valve means permits idle circulation through said first chamber into the interior of said housing when said reversing valve is in said first position thereof; motion transmitting means connecting said first and said second actuating means and being movable between a first position permitting closing of said first valve means by said spring means while said second valve means is fully opened by said second actuating means, and a second position permitting closing of said second valve means by said spring means while said first valve means is fully opened by said first actuating means whereby the hydraulic motor is braked, and an intermediate position in which said first and said second actuating means keep said first and second valve means partly opened; and operating means moving said motion transmitting means between said positions.

5. In an arrangement including a rotary pump having a movable control valve controlling the output of said pump in accordance with the position of said control valve, in combination, hydraulic servomotor means; actuating means operatively connecting said servomotor means with the control valve for adjusting the latter by said servomotor means; first conduit means and second conduit means connected to said servomotor, so that a fluid passing from said first conduit means into said servomotor and fluid discharging therefrom into said second conduit means moves said servomotor and said control valve in one direction, and a fluid passing from said second conduit means into said servomotor and fluid discharging therefrom into said first conduit means moves said servomotor in the opposite direction; auxiliary pump means including discharge conduit means and suction conduit means; and regulating valve means movable between a first, a second and a third position, and in the first position connecting said discharge conduit means of said auxiliary pump means with said first conduit means, and said suction conduit means with said second conduit means for moving said servomotor and said control valve in one direction, in said second position connecting said discharge conduit means with said suction conduit means of said auxiliary pump means while closing said first and said second conduit means and stopping said servomotor, and in said third position connecting said discharge conduit means of said auxiliary pump means with said second conduit means and said suction conduit means of said auxiliary pump means with said first conduit means for moving said servomotor and said control valve in the opposite direction; spring means urging said regulating valve means from said first position into said second and third positions; and centrifugal means operatively connected with the controlled rotary pump and rotating with the same, said centrifugal means engaging said regulating valve means, and urging the same during rotation from said third position into said second and first positions against the action of said spring means.

6. In an arrangement including a rotary pump having a movable control valve controlling the output of said pump in accordance with the position of said control valve, and a prime mover driving said pump and having a rotary speed controlled jointly with the output regulation of said controlled rotary pump, in combination, hydraulic servomotor means operating said control valve; auxiliary pump means; conduit means connecting said auxiliary pump means and said servomotor means; a regulating valve means arranged in said conduit means movably between a first position, a second position, and a third position and in said first and third positions causing adjustment of said control valve by said servomotor means in opposite directions, and in said second intermediate position stopping movement of said servomotor and of said control valve; spring means urging said regulating valve means from said first position into said second and third positions; centrifugal means operatively connected with the controlled rotary pump and rotating with the same, said centrifugal means engaging said regulating valve means, and urging the same during rotation from said third position into said second and first positions against the action of said spring means; and movable operating means engaging said spring means and when moved, urging the same towards said regulating valve means gradually increasing the pressure on the same so that a higher speed of said centrifugal means and of the controlled rotary pump is required for holding said regulating valve in said second position.

7. In an arrangement including a rotary pump having a movable control valve controlling the output of said pump in accordance with the position of said control valve, a prime mover driving said pump and having a rotary speed controlled jointly with the output regulation of said controlled rotary pump, and a movable speed control means regulating the speed of the prime mover, in combination, hydraulic servomotor means operating said control valve; auxiliary pump means; conduit means connecting said auxiliary pump means and said servomotor means; a regulating valve means arranged in said conduit means movably between a first position, a second position, and a third position and in said first and third positions causing adjustment of said control valve by said servomotor means in opposite directions, and in said second intermediate position stopping movement of said servomotor and of said control valve; spring means urging said regulating valve means from said first position into said second and third positions; centrifugal means operatively connected with the controlled rotary pump and rotating with the same, said centrifugal means engaging said regulating valve means, and urging the same during rotation from said third position into said second and first positions against the action of said spring means; movable operating means engaging said spring means and when moved, urging the same towards said regulating valve means gradually increasing the pressure on the same so that a higher speed of said centrifugal means and of the controlled rotary pump is required for holding said regulating valve in said second position; and actuating means connecting said movable operating means with said speed control means of said prime mover and adjusting the speed of said prime mover in accordance with the position of said movable operating means whereby the speed of said prime mover is adjusted to the output of said rotary pump controlled by said control valve.

8. In an arrangement including a rotary pump having a movable control valve controlling the output of said pump in accordance with the position of said control valve, a prime mover driving said pump and having a rotary speed controlled jointly with the output regulation of said controlled rotary pump, and a movable speed control means regulating the speed of the prime mover, in combination, hydraulic servomotor means operating said control valve; auxiliary pump means; conduit means connecting said auxiliary pump means and said servomotor means; a regulating valve means arranged in said conduit means movably between a first position, a second position, and a third position and in said first and third positions causing adjustment of said control valve by said servomotor means in opposite directions, and in said second intermediate position stopping movement of said servomotor and of said control valve; spring means urging said regulating valve means from said first position into said second and third positions; centrifugal means operatively connected with the controlled rotary pump and rotating with the same, said centrifugal means engaging said regulating valve means, and urging the same during rotation from said third position into said second and first positions against the action of said spring means; movable operating means engaging said spring means and when moved, urging the same towards said regulating valve means gradually increasing the pressure on the same so that a higher speed of the controlled rotary pump is required for holding said regulating valve in said second position; actuating means connecting said movable operating means with said speed control means of said prime mover and adjusting the speed of said prime mover in accordance with the position of said movable operating means whereby the speed of said prime mover is adjusted to the output of said rotary pump controlled by said control valve; a lever system connected at one end thereof to said actuating means; and an actuating rod connected to said servomotor and moved by the same, said actuating rod engaging the other end of said lever system when said servomotor moves the control valve almost to the end position thereof which corresponds to maximum output of the controlled rotary pump, said actuating rod moving said lever system and therethrough said actuating means to adjust the speed control means of said prime mover independently of the adjustment thereof by said movable operating means during the last part movement of said control valve towards said end position thereof.

9. In a hydraulic drive including a pump and at least one hydraulic motor, a coupling arrangement comprising, in combination, a housing communicating with the suction side of the pump; a casing having a first chamber formed with an outlet communicating with the supply side of the hydraulic motor and a second chamber having an inlet communicating with the discharge side of the hydraulic motor, said casing having two pairs of parallel valve seat portions, one pair of valve seat portions in each of said chambers; conduit means connecting said first chamber with the discharge side of said pump; first valve means mounted on said casing and in open position connecting said first chamber with the interior of said housing; a second valve means mounted on said casing and in open position connecting said second chamber with the interior of said housing, each of said first and second valve means including a larger valve head seated on the outside and a smaller valve head seated on the inside of said casing on one pair of said two pairs of valve seat portions, and means fixedly connecting to said valve head, the pressure in said casing causing a higher pressure on said larger valve heads and tending to open said first and second valve means; spring means engaging said first and second valve means urging the same into closed positions; and actuating means engaging said first and second valve means for opening the same against the action of said spring means, opening of said second valve means permitting circulation of a fluid discharged from the pump through said hydraulic motor into said housing and therefrom back to the pump, while opening of said first valve means permits idle circulation of fluid through said first chamber into the interior of said housing.

10. In an arrangement including a rotary pump having a movable control valve controlling the output of said pump in accordance with the position of said control valve, and a prime mover driving said pump and having a rotary speed controlled jointly with the output regulation of said controlled rotary pump, in combination, hydraulic servomotor means operating said control valve; auxiliary pump means; conduit means connecting said auxiliary pump means and said servomotor means; a regulating valve means arranged in said conduit means movably between a first position, a second position, and a third position and in said first and third positions causing adjustment of said control valve by said servomotor means in opposite directions, and in said second intermediate position stopping movement of said servomotor and of said control valve; spring means urging said regulating valve means from said first position into said second and third positions; centrifugal means operatively connected with the controlled rotary pump and rotating with the same, said centrifugal means engaging said regulating valve means, and urging the same during rotation from said third position into said second and first positions against the action of said spring means; movable speed control means for regulating the speed of the prime mover; actuating means connecting said regulating valve means with said speed control means for adjusting the speed of said prime mover in accordance with the position of said regulating valve means whereby the speed of said prime mover is adjusted to the output of said rotary pump; motion transmitting means connected to said actuating means and including an actuating rod connected to said servomotor and actuated by the same, said actuating rod operating said actuating means to adjust said speed control means of said prime mover during the last part of the movement of said servomotor means when the same move said control valve means toward the end position of the same which corresponds to maximum output of the controlled rotary pump.

References Cited in the file of this patent

UNITED STATES PATENTS

| Number | Name | Date |
|---|---|---|
| 1,615,341 | Murray | Jan. 25, 1927 |
| 1,803,933 | Dooley | May 5, 1931 |
| 1,859,721 | Stanley | May 24, 1932 |
| 2,257,724 | Bennetch | Oct. 7, 1941 |
| 2,275,321 | Scates | Mar. 3, 1942 |
| 2,326,821 | Boyle | Aug. 17, 1943 |
| 2,379,938 | Swanson | July 10, 1945 |
| 2,393,882 | Blair | Jan. 29, 1946 |
| 2,500,580 | Segsworth | Mar. 14, 1950 |
| 2,509,321 | Topanelian | May 30, 1950 |
| 2,516,662 | Vickers et al. | July 25, 1950 |